Jan. 21, 1958      F. HEUNEMAN      2,820,501
TRACTION AID FOR AUTOMOBILE WHEELS
Filed March 15, 1956      2 Sheets-Sheet 1

INVENTOR.
Fred Heuneman,
BY Richards and Cifelli,
Attorneys

Jan. 21, 1958   F. HEUNEMAN   2,820,501
TRACTION AID FOR AUTOMOBILE WHEELS
Filed March 15, 1956   2 Sheets-Sheet 2
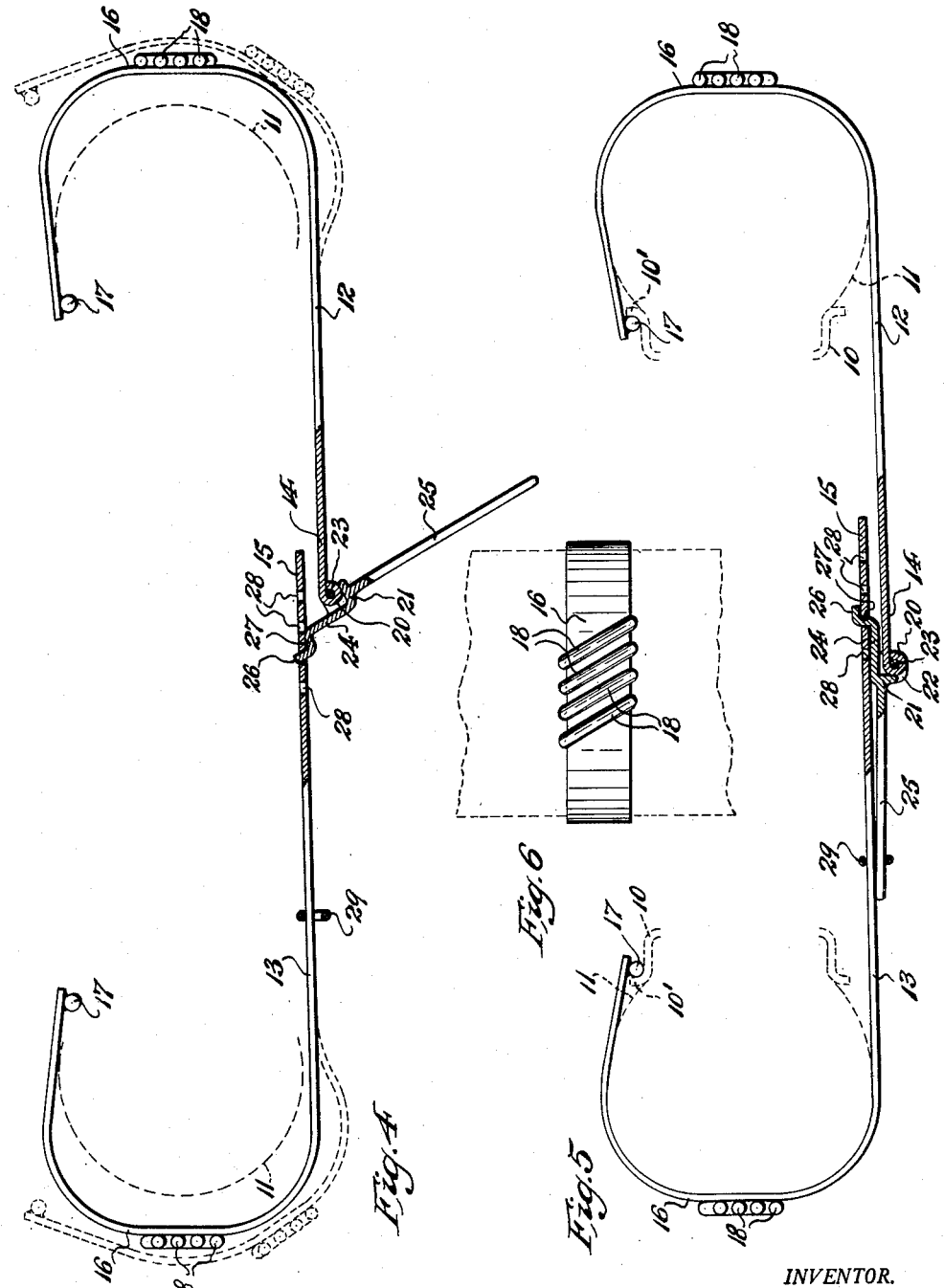
INVENTOR.
Fred Heuneman,
BY Richards and Cifelli,
Attorneys

United States Patent Office 2,820,501
Patented Jan. 21, 1958

2,820,501

TRACTION AID FOR AUTOMOBILE WHEELS

Fred Heuneman, Livingston, N. J.

Application March 15, 1956, Serial No. 571,764

5 Claims. (Cl. 152—218)

This invention relates to an improved device which can be removably attached to driving wheels of an automobile, whereby to provide the tread of pneumatic tires of such wheels with traction aid means when traversing snowy or muddy road surfaces.

The invention has for an object to provide a traction aid device for the stated purposes which can be quickly and easily applied to an automobile wheel and tire without necessity for jacking up the same; said device comprising a longitudinally extensible and contractible body made of springy steel strip or like material, which is adapted to extend diametrically across the outer face of the wheel and tire, at least the wheel tire embracing end portions of said body being sufficiently flexible to permit temporary outward spreading thereof for passage over and across the tire, so that, when released from spread condition, to close around the tire and rim, the extremities of said end portions being provided with means to engage and anchor the same to inner side portions of the wheel rim, and said end portions having, on the parts thereof which overlie the tire tread, external traction gripper elements.

The invention has for a further object to provide the traction aid device in a two part form, the parts of which can be relatively adjusted according to the diameter of the wheel and tire to which the device is to be applied; manipulatable coupling lever means being provided for locking the parts together in selected relatively adjusted relation, with their tire embracing end portions bound to the wheel and tire in traction service relation thereto.

Figure 1:
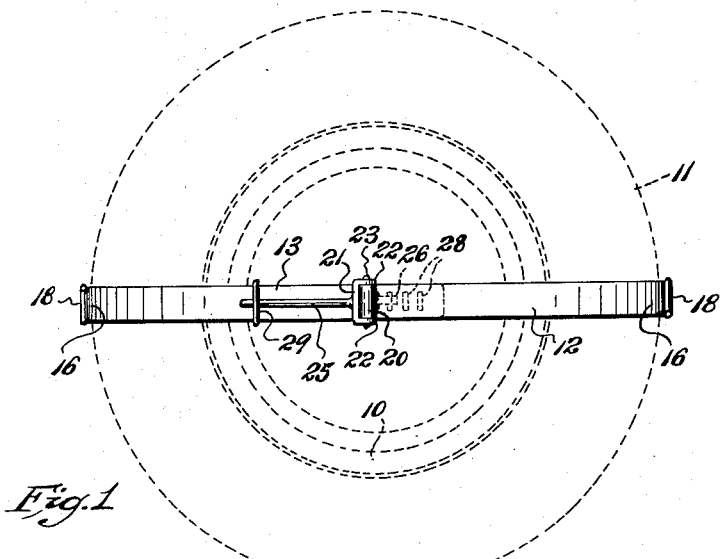
Figure 3:
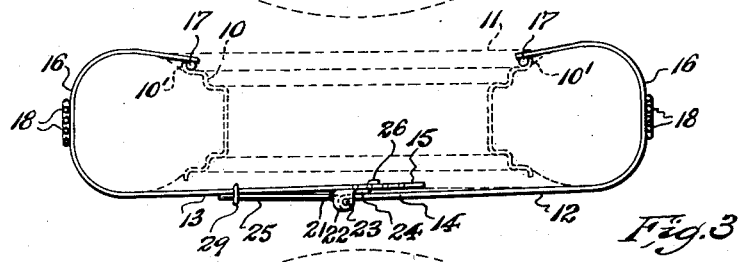
Figure 2:
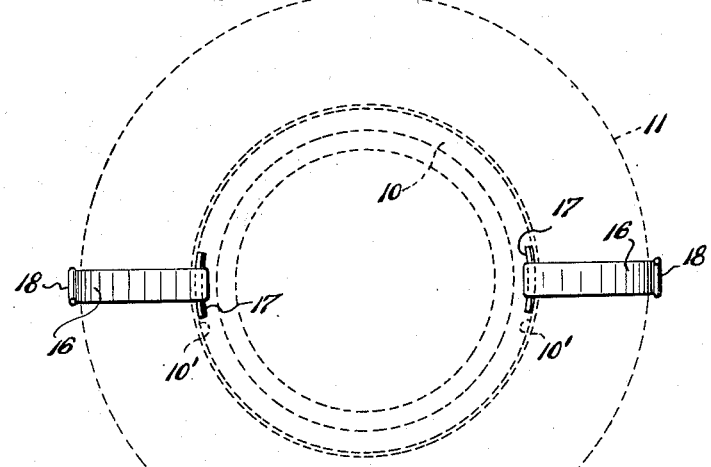

The above and other objects will become apparent from a reading of the following detailed description of an embodiment of this invention in connection with the accompanying drawings thereof, in which:

Fig. 1 is a front face elevational view and Fig. 2 is a rear face elevational view of an automobile wheel (shown by broken lines) with the traction aid device (shown by full lines) operatively attached thereto; and Fig. 3 is a top plan view of the same.

Fig. 4 is a top plan or edge view of the traction aid device with its parts longitudinally extended preparatory to mounting the same on an automobile wheel, the temporary outspreading flexing of the end portions of the device, to facilitate passage thereof over the wheel tire, being shown by broken lines; and Fig. 5 is a similar view showing the traction aid device longitudinally contracted and secured relative to the automobile wheel and tire; these views being drawn on an enlarged scale.

Fig. 6 is an end view of the traction aid device.

Referring to the drawings, in which like characters of reference indicate corresponding parts, the reference character 10 indicates the rim of an automobile wheel, and 11 the pneumatic tire thereon.

The traction aid device comprises a pair of oppositely extending, longitudinally aligned body members 12 and 13 made of springy steel strip or like material of suitable width and thickness. The meeting inner end portions of the body members are relatively disposed in lapped relation, with the inner end portion 14 of the body member 12 overlying the inner end portion 15 of the body member 13. Each body member 12 and 13 terminates in an inwardly curved or hooked outer end portion 16, which is adapted to be engaged over and around the wheel tire 11 across the tread face of the latter. Affixed to and across the inner face of each outer end portion 16, adjacent to its extremity, as e. g. by welding the same thereto, is a transverse anchor bar 17. This anchor bar is preferably of arcuate formation lengthwise, whereby to substantially correspond to the circumferential curvature of an outwardly flared external marginal flange 10' of the wheel rim 10. Also affixed to and across the exterior face of that part of each outer end portion 16 which overlies the tire tread, as e. g. by welding the same thereto, are a plurality of spaced apart externally projecting traction gripper elements 18, the same being preferably arranged in diagonal disposition as shown.

The meeting inner end portions 14 and 15 of the body members 12 and 13 are provided with cooperative means whereby said body members can be relatively adjusted to predetermine the operative length of the traction aid device to accord with the diameter of the wheel and tire to which the device is desired to be attached; said means also serving to releasably interlock the adjusted body members together, when the traction device is applied in its operative attached relation to the wheel and tire. To serve such purposes, the extremity of the inner end portion 14 of the body member 12 is provided with a transverse tubular bearing element 20, as a unitary part thereof. Pivotally mounted in connection with the bearing element 20 is a coupling lever member 21, the same being provided with perforate hinging ears 22 which straddle said bearing element, and which are adapted to be pivotally joined with the latter by a pivot pin 23 supported therethrough. Said coupling lever member is provided with an inner arm 24 and an oppositely extending outer arm 25, the latter providing a hand lever by which the coupling lever member can be manipulated. The inner arm 24 terminates in a latching tongue 26 offset therefrom by an intermediate angular stop shoulder 27. The inner end portion 15 of the body member 13 is provided with a plurality of suitably longitudinally spaced apart openings or slots 28, which are adapted to be selectively engaged by said inner arm 24 of the coupling lever member by reception of the latching tongue 26 and stop shoulder 27 thereof. Carried by the body member 13 is a fastener loop 29 which is engageable over the outer arm 25 of the coupling lever member 21, when the latter is disposed in coupling and interlocking relation to the body members 12 and 13.

In the manipulation of the traction device, preparatory to attaching the same in operative relation to rim and tire of a wheel to be served thereby, the coupling lever member 21 is released by swinging the same about its pivotal connection with the body member 12 in counterclockwise direction. The curved or hooked outer end portions 16 of the body members 12 and 13 are respectively engaged across and around diametrically opposite portions of the tire 11. Since these outer end portions 16 are flexibly yieldable, the same may be temporarily bent outwardly (as shown by broken line delineation thereof in Fig. 4), whereby to facilitate inward movement thereof across the tire tread. After said outer end portions 16 are aligned with the tire 11, and then released from outspreading flexure, the same will spring back to their normal curved or hooked shape, so as to embrace the tire, and so as to engage their anchor bars 17 with the wheel rim flanges 10'. This having been done, the latching tongue 26 of the coupling lever member 21 is aligned with and entered through a selected opening or slot 28 of the body member 13 (see Fig. 4), whereupon the hand lever arm 25 of the coupling lever member is swung in clockwise direction. The resultant clockwise movement of the coupling lever member causes the body member 12 to be drawn inwardly from right to left, while the inner arm 24 exerts its leverage to draw the body member 13 inwardly from left to right, i. e. in the opposite direction. The effect of this is to move the outer end portions 16 of the respective body members 12 and 13 toward the wheel tire 11 so as to firmly bind the same to and against the tire tread surface. During this operation, the latching tongue 26 passes through the engaged opening or slot 28 of the body member 13, followed by the stop shoulder 27, which enters the latter so as to engage the body member 13, thus holding the body members 12 and 13 against relaxation from their relatively in-drawn positions. The operation is completed when the hand lever arm 25 of the coupling lever member 21 reaches and is stopped against the outer face of the body member 13, whereupon the fastener loop 29 is engaged over said hand lever arm, thus locking down the coupling lever member 21 against accidental release (see Fig. 5).

From the above, it will now be understood that this invention provides a traction device, for automobile and like wheels, which is of a very simple, inexpensive and yet efficient construction, involving but three movable parts, viz. the respective body members 12 and 13, and the coupling lever member 21. It will also be apparent that the traction device of this invention can be very quickly applied to a wheel and tire desired to be served thereby with a minimum expenditure of labor, and without necessity for jacking up the wheel or tire.

It will be understood that some variation in the form, details of construction, and relative proportions and arrangement of the parts of the traction aid device may be made, and consequently limitation to the particular illustrative embodiment of this invention, as shown and hereinabove described, is not intended, except as may be required by the scope of the following claims.

Having now described my invention, I claim:

1. A traction aid device adapted to be detachably mounted in transverse relation to and across the rim and tire of an automobile wheel, said device comprising a pair of longitudinally aligned, oppositely extending sheet metal body members of substantial width, each terminating at its outer end in a curved outer end portion integral therewith and respectively adapted to be disposed across diametrically opposite portions of the wheel tire and having, across the inner faces of their free ends, inwardly offset transverse anchor elements to engage under an external flange of the wheel rim in holding relation thereto at the inner side thereof, inner end portions of said body members being adapted to lap one over the other, the lapped inner end portions of said body members being provided with cooperative manipulatable coupling means to releasably join the same together in relatively in-drawn relation, whereby to in-draw said outer end portions thereof in bound relation to the wheel tire across the tread surface thereof, and said curved outer end portions of the body members having externally projecting traction gripper elements thereon.

2. A traction device according to claim 1, wherein the curved outer end portions of the body members are flexibly yieldable for out-swinging movement to facilitate passing thereof across the wheel tire to and from operative relation to the tire and wheel rim.

3. A traction device according to claim 1, wherein the manipulatable means for releasably joining the body members comprises a coupling lever member pivotally carried by the inner end portion of one said body member, and the inner end portion of the other body member having longitudinally spaced openings for selective engagement by said coupling lever member.

4. A traction device according to claim 3, wherein the curved outer end portions of the body members are flexibly yieldable for out-swinging movement to facilitate passing thereof across the wheel tire to and from operative relation to the tire and wheel rim.

5. A traction aid device adapted to be detachably mounted in transverse relation to and across the rim and tire of an automobile wheel, said device comprising a pair of longitudinally aligned, oppositely extending sheet metal body members of substantial width, each terminating at its outer end in a curved flexible outer end portion respectively, adapted to be disposed across diametrically opposite portions of the wheel tire and having, across inner faces of their free ends, inwardly offset transverse anchor bars of substantial length to engage the wheel rim in holding relation thereto at the inner sides thereof, said curved outer end portions having externally projecting traction gripper elements across the tire tread bordering portion thereof, inner end portions of said body members being adapted to lap one over the other, the overlying lapped inner end portion of one body member having a coupling lever member pivotally supported thereby, said coupling lever member comprising an inner arm and an outer arm, the latter providing a hand lever means, said inner arm terminating in a latching tongue offset therefrom by an intermediate stop shoulder, the underlying lapped inner end portion of the other body member having a plurality of longitudinally spaced openings adapted to be selectively engaged by the latching tongue and stop shoulder of the coupling lever member, and releasable means slidably mounted on the body member which carries the coupling lever member, said means being adapted to be engaged over the hand lever portion of said coupling lever member, whereby to retain the latter against accidental release from its operative position.

References Cited in the file of this patent

UNITED STATES PATENTS

| | | |
|---|---|---|
| 1,017,909 | Reid | Feb. 20, 1912 |
| 2,449,033 | Younglove | Sept. 7, 1948 |
| 2,581,578 | Cruse | Jan. 8, 1952 |
| 2,638,140 | Paulsen | May 12, 1953 |